United States Patent
Wu et al.

(10) Patent No.: US 8,180,158 B2
(45) Date of Patent: May 15, 2012

(54) IMAGE PROCESSING DEVICE AND IMAGE PROCESSING METHOD FOR DETECTING A SPECIFIC SHAPE FROM AN IMAGE

(75) Inventors: Gang Wu, Beijing (CN); Weijie Liu, Kanagawa (JP); Xiaohui Xie, Beijing (CN); Qiang Wei, Beijing (CN)

(73) Assignee: Panasonic Corporation, Osaka (JP)

( * ) Notice: Subject to any disclaimer, the term of this patent is extended or adjusted under 35 U.S.C. 154(b) by 319 days.

(21) Appl. No.: 12/634,290

(22) Filed: Dec. 9, 2009

(65) Prior Publication Data

US 2010/0086219 A1  Apr. 8, 2010

Related U.S. Application Data

(63) Continuation of application No. 12/374,153, filed as application No. PCT/JP2007/064091 on Jul. 17, 2007, now abandoned.

(30) Foreign Application Priority Data

Jul. 17, 2006 (CN) .......................... 2006 1 0105667

(51) Int. Cl.
*G06K 9/62* (2006.01)
(52) U.S. Cl. ...................................... 382/203
(58) Field of Classification Search .................. None
See application file for complete search history.

(56) References Cited

U.S. PATENT DOCUMENTS

| | | | |
|---|---|---|---|
| 3,069,654 A | | 12/1962 | Hough |
| 4,769,850 A | * | 9/1988 | Itoh et al. ...................... 382/132 |
| 4,783,829 A | * | 11/1988 | Miyakawa et al. ........... 382/199 |
| 4,922,543 A | * | 5/1990 | Ahlbom et al. ............... 382/291 |
| 4,969,201 A | * | 11/1990 | Takasaki et al. .............. 382/199 |
| 5,546,476 A | * | 8/1996 | Mitaka et al. ................. 382/201 |
| 5,579,415 A | | 11/1996 | Takano et al. |

(Continued)

FOREIGN PATENT DOCUMENTS

JP  2-96287 A  4/1990

(Continued)

OTHER PUBLICATIONS

Gang Wu et al., A Shape Detection Method Based on the Radial Symmetry Nature and Direction-Discriminating Voting, IEEE, Jul. 2007, pp. 169-172.*

(Continued)

*Primary Examiner* — Brian P Werner
(74) *Attorney, Agent, or Firm* — Greenblum & Bernstein, P.L.C.

(57) ABSTRACT

An image processing device capable of high-speed detection of a specific shape in an image. In the image processing device, a candidate position calculation section (106) obtains a first candidate position of the center point of a first circle in contact at three points with three sides contained in the shape of an object to be detected. An angle calculation section (106) obtains an angle formed by a normal line drawn from each of the three sides to the first candidate position and a standard line oriented in a specific direction and passing a point at which the normal line and each of the three sides cross. A relative relationship calculation section (106) obtains a relationship of the angle relative to the first candidate position. A recognition section (108) recognizes the shape contained in the given image based on the relative relationship of the angle and a relative relationship of a shape stored in advance.

7 Claims, 9 Drawing Sheets

U.S. PATENT DOCUMENTS

| | | | |
|---|---|---|---|
| 5,862,245 A * | 1/1999 | Renouard et al. | 382/113 |
| 6,157,750 A * | 12/2000 | Choi et al. | 382/301 |
| 6,393,159 B1 * | 5/2002 | Prasad et al. | 382/259 |
| 7,177,480 B2 * | 2/2007 | Ikeda et al. | 382/259 |
| 2002/0037105 A1 * | 3/2002 | Michael | 382/203 |
| 2003/0053697 A1 * | 3/2003 | Aylward et al. | 382/203 |
| 2006/0098877 A1 * | 5/2006 | Barnes et al. | 382/203 |
| 2006/0291726 A1 | 12/2006 | Takeshima et al. | |

FOREIGN PATENT DOCUMENTS

| | | | |
|---|---|---|---|
| JP | 02096287 A * | 4/1990 | |
| JP | 7-65175 A | 3/1995 | |
| JP | 07065175 A * | 3/1995 | |
| JP | 2003-199151 A | 7/2003 | |
| JP | 2005-044033 A | 2/2005 | |
| JP | 2005-346287 A | 12/2005 | |

OTHER PUBLICATIONS

Ballard, "Generalizing the Hough Transform to Detect Arbitrary Shapes," Pattern Recognition, vol. 13, No. 2, pp. 111-122 (1981).

* cited by examiner

IMAGE PROCESSING DEVICE AND IMAGE PROCESSING METHOD FOR DETECTING A SPECIFIC SHAPE FROM AN IMAGE

CROSS-REFERENCE TO RELATED APPLICATIONS

This is a continuation application of pending U.S. patent application Ser. No. 12/374,153, filed Jan. 16, 2009, which is a 371 of PCT/JP2007/064091 filed Jul. 17, 2007, and which continuation application claims priority of Chinese Application No. 200610105667.3, filed Jul. 17, 2006, the contents of which are expressly incorporated herein by reference in their entireties.

TECHNICAL FIELD

The present invention relates to an image processing apparatus and image processing method for detecting a specific shape from an image.

BACKGROUND ART

Up till now, image processing apparatuses or methods for detecting specific shapes from picked-up images are widely used. For example, in image processing apparatuses for FA (Factory Automation), detection of misselection of parts and detection of defects in partial shapes are realized by detecting the partial shapes. Further, detection of specific shapes is used in recent robot navigations to recognize leading signs and recognize buildings by remote sensing. Further, to assist driving, there are apparatuses that recognize traffic signs to notify the driver of information about the recognized traffic signs or use the information about the traffic signs for vehicle control. A sign recognition apparatus recognizes traffic signs by picking up an image in the front by a camera, extracting the image of a specific area from the picked-up image according to, for example, the shapes used for traffic signs, and by performing pattern recognition such as template matching between the extracted image and a template image of traffic signs.

In shape detection, a conventional Hough transform (see Patent Document 1) is used. Here, voting is performed for parameters of analytic formula that describes the shape by edge points of the image to calculate the parameters of the analytic formula for the shape from the peak values in the parameter space. The standard Hough transform method is used for only the shape represented by the analytic formula such as straight lines and circles. By contrast with this, the generalized Hough transform method (see Non-Patent Document 1) can detect arbitrary shapes. In the generalized Hough transform method, a reference point is designated, and the association relationships between features of the points of a shape and the geometrical relationships between the points and the reference point, are prepared in advance by a standard template for the shape. There are generally a plurality of the above-noted association relationships, and, consequently, to detect an image, voting is performed for all of the possible association relationships from the edge points of the image. From the voting result, the association relationship of high possibility is found and the target shape is detected. Further, to realize improved processing speed of the Hough transform and generalized Hough transform, for example, a technique of limiting the number of voting points is employed (see Patent Document 2).

Further, a technique of detecting regular polygons using a voting method different from the Hough transform is suggested (see Patent Document 3). In this technique, voting is performed for the center of a shape having edge points in radial symmetry, and, consequently, the voting space is actually the same as the image space. Therefore, the processing speed is higher than the conventional Hough transform.

Patent Document 1: U.S. Patent Application Laid-open No. 3069654

Patent Document 2: U.S. Patent Application Laid-open No. 2006/0291726

Patent Document 3: U.S. Patent Application Laid-open No. 2006/0098877

Non-Patent Document 1: D. H. Ballard, "Generalizing the Hough transform to detect arbitrary shapes, Pattern Recognition," Vol. 13, No. 2, 1981

DISCLOSURE OF INVENTION

Problem to be Solved by the Invention

With the conventional techniques, there is a problem of not being able to detect arbitrary shapes at high speed. Although the generalized Hough transform is applicable to arbitrary shapes, the number of dimensions of the voting space is high, and therefore high-speed detection is difficult to realize. For example, taking into account the scale transform and rotation parameters of a shape, the number of dimensions of the general voting space is more than three. Further, although the technique disclosed in Patent Document 3 can be realized at high speed, there is a problem that this technique is not applicable to shapes different from regular polygons.

Further, with the conventional shape detecting method, the components of the target shape is detected individually or all of the components are comprehensively detected. Therefore, for example, Patent Document 3 discloses using the intensity of edge points, and, consequently, robustness for detection of specific combinations of components is not sufficient.

It is therefore an object of the present invention to provide an image processing apparatus and image processing method for detecting specific shapes from an image at high speed and improving robustness.

Means for Solving the Problem

The image processing apparatus of the present invention employs a configuration having: a candidate position calculating section that calculates, from a given image, a first candidate position for a center point of a first circle tangent to three sides included in a detection target shape at three points; an angle calculating section that calculates angles formed by normals from the three sides to the first candidate position and reference lines of a uniform direction passing points where the normals and the sides cross; a relative relationship calculating section that calculates relative relationships of the angles with respect to the first candidate position; and a recognizing section that recognizes a shape included in the given image from the relative relationships of the angles and relative relationships of angles of a shape stored in advance.

ADVANTAGEOUS EFFECT OF THE INVENTION

According to the present invention, it is possible to detect specific shapes at high speed from an image and improve robustness.

BEST MODE FOR CARRYING OUT THE INVENTION

An embodiment will be explained below in detail with reference to the accompanying drawings. In the embodiment in the following explanation, a combination of line segments of a specific shape means that the outline of an image of the detection target includes one or more line segments. The outline may form an open shape or a closed shape. Further, line segments may include curves.

The disclosure of Chinese Patent Application No. 200610105671.X, filed on Jul. 17, 2006, including the specification, drawings and abstract, is incorporated herein by reference in its entirety.

Embodiment 1

Figure 1:
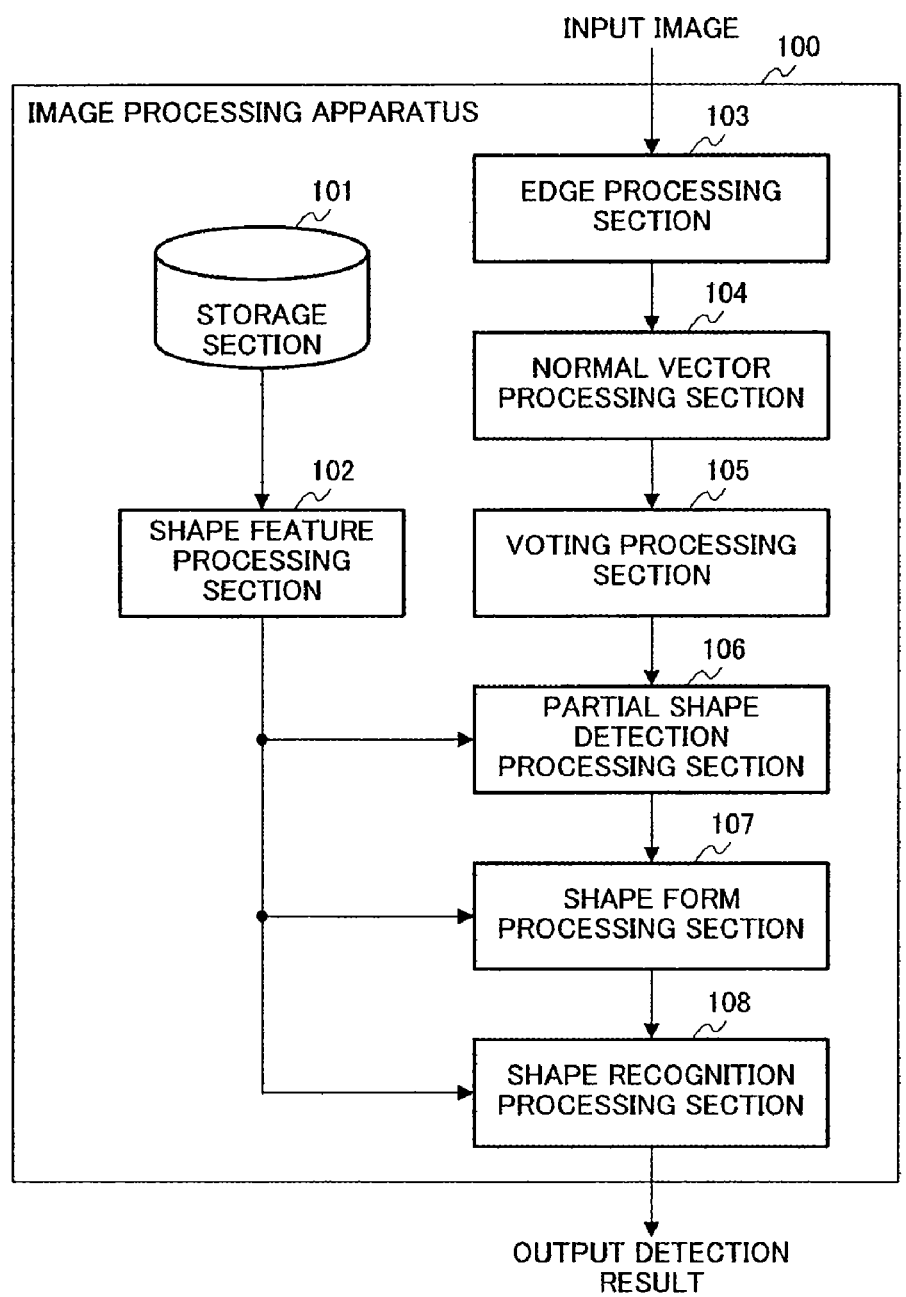
FIG. 1 illustrates the configuration of an image processing apparatus according to Embodiment 1 of the present invention.

FIG. 1 illustrates the configuration of the image processing apparatus according to Embodiment 1 of the present invention. In image processing apparatus 100 shown in FIG. 1, storage section 101 stores a specific shape of the detection target as a standard template. Shape feature processing section 102 generates a component feature table describing the component feature of the specific shape from the standard template of the specific shape of the detection target stored in storage section 101. For example, shape feature processing section 102 extracts a circle (hereinafter "inscribed circle") tangent to three arbitrary sides at three points as shown in FIG. 3, from the standard template shown in FIG. 2A. In the example shown in FIG. 3, shape feature processing section 102 extracts four inscribed circles in total (i.e., O1, r1; O2, r2; O3, r3; O4, r4). As shown in table 1, shape feature processing section 102 describes a component feature table showing the center point, radius, and normal directions at the tangent points of each inscribed circle, and also describes the relative positional relationships between the center points of the inscribed circles. In a case of a straight line, the normal direction of each point of the straight line is the same. For each inscribed circle, the normal directions are measured the same times as the number of tangent points. In FIG. 3, there are four normal directions in total, and part of the normal directions is shared between any two inscribed circles. Shape feature processing section 102 normally performs processing offline.

TABLE 1

| Center point | Radius | Normal directions of tangent points |
|---|---|---|
| O1 | r1 | θ4, θ1, θ2 |
| O2 | r2 | θ1, θ2, θ3 |
| O3 | r3 | θ2, θ3, θ4 |
| O4 | r4 | θ3, θ4, θ1 |

The coordinates of center points O2, O3 and O4 show the relative positions of center points O2, O3 and O4 with respect to the coordinate of center point O1.

Edge processing section 103 extracts the edges of an input image outputted from an imaging section of a camera or the like. For example, in the example shown in FIG. 2B, the edges of all figures S1, S2 and S3 are extracted. According to the present embodiment, the edge extracting method is not limited. For example, it is possible to use known methods such as Canny, Sobel and LoG edge detection filters. Although an example is explained with the present embodiment where an input image is obtained from an imaging section like a camera, it is equally possible to apply the processing of detecting shapes from some stored images.

Normal vector processing section 104 measures the normal (gradient) direction of each edge point found in edge processing section 103. For example, normal vector processing section 104 finds the edge points and normal directions shown in FIG. 2C for figures in the original image shown in FIG. 2B.

Figure 5:
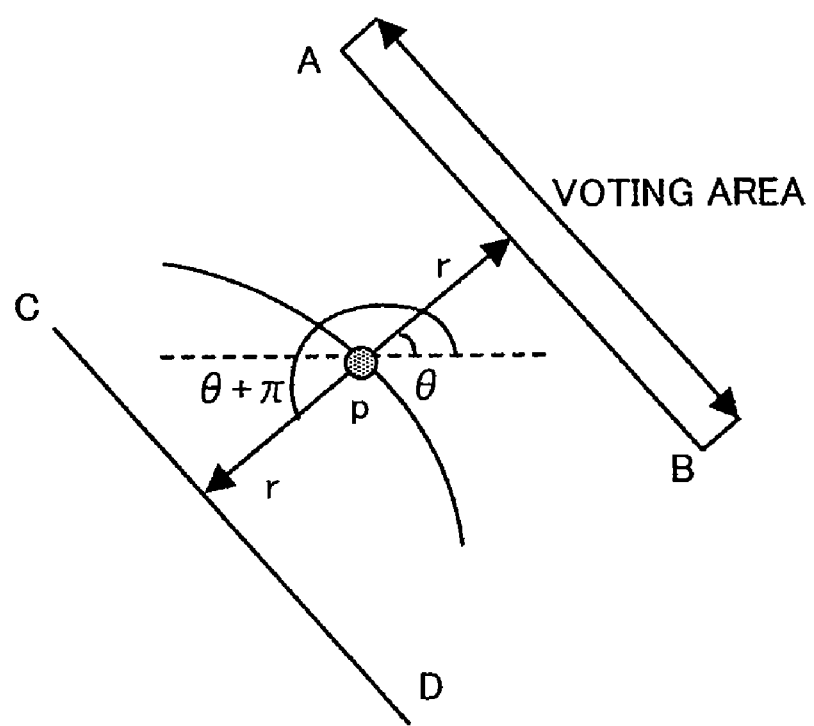
FIG. 5 illustrates an example of a voting area according to Embodiment 1.

Voting processing section 105 finds the voting areas for each edge point, adds votes or increments the voting values of all points in the voting areas. For example, an example of a voting area will be shown in FIG. 5. In FIG. 5, p is the edge point, θ is the normal direction of edge point p, r is the designated voting radius, and line segments AB and CD are the voting areas. Normal direction θ is the gradient direction of edge point p. The direction of line segments AB and CD is orthogonal to the normal, and the length of these line segments is generally proportional to r. For example, length L of the line segments is expressed by following equation 1.

$$L = a \cdot r + b \quad \text{(Equation 1)}$$

where a and b are predetermined coefficients.

Voting processing section 105 normally designates in order a plurality of values for voting radius r in a certain range $[r_{min}, r_{max}]$. Here, voting means incrementing the voting values $S(q)$ of all points q included in voting areas AB and CD. For example, incrementing voting value $S(q)$ can be expressed by following formula 2.

$$S(q) \leftarrow S(q) + 1 \quad \text{(Formula 2)}$$

where voting processing section 105 sets the initial values of $S(q)$ for all points q to the same value such as "0." At the same time, voting processing section 105 stores voting direction $D(s(q))$. For example, voting direction $D(s(q))$ can be expressed by following equation 3.

$$D(s(q)) = \theta \text{ or } \theta + \pi \quad \text{(Equation 3)}$$

Upon voting, it is possible to set the positions of points q to pixel points or to positions between pixel points. Further, the sum of voting areas for all the pixel points, is referred to as the voting range. Generally, the voting range can be set the same as the image range, that is, the range including all the pixel points. The basic method of voting processing has been described above. However, the details of calculation methods including the determination for the voting range and voting areas, and the addition of voting values, are not specifically limited. For example, it is possible to use the voting area setting method shown in Patent Document 3.

Figure 6:
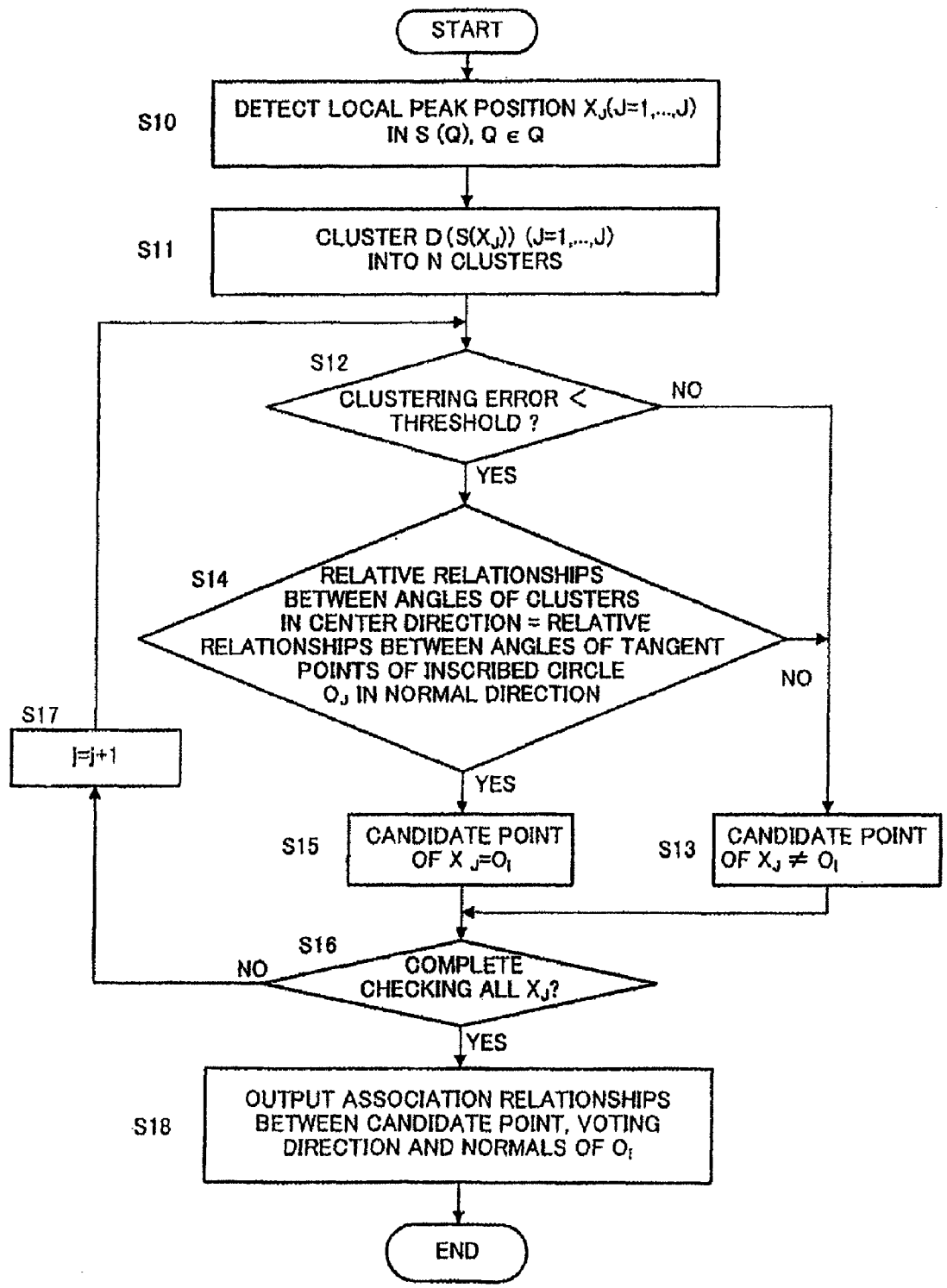
FIG. 6 illustrates a flowchart showing inscribed circle detection processing in the partial shape detection processing section in FIG. 1.

Partial shape detecting processing section 106 detects a combination of line segments matching based on the processing result in shape feature processing section 102 and the processing result in voting processing section 105. To be more specific, in an example of detecting inscribed circle (O1, r1) shown in FIG. 3 and table 1, the operation flow in partial shape detection processing section 106 will be explained with reference to FIG. 6. FIG. 6 illustrates a flowchart showing the inscribed circle detection processing in partial shape detection processing section 106.

First, in step S10, partial shape detection processing section 106 (equivalent to the candidate position calculating section of the present invention) finds the local peak positions of voting values $S(q)$ of all the points q in the voting range Q. The local peak position is the point at which the voting value is locally high. For example, the local peak position is expressed by $x_j$ (j=1, . . . , J), and set the candidate position of center point position O1 at the peak positions.

Next, in step S11, partial shape detection processing section 106 arranges the voting direction of local peak position $x_j$. To be more specific, the number of normals, n, tangent to the inscribed circle (O1, r1) is three, and voting direction $D(S(q))$ stored in voting processing section 105 is clustered into three clusters by known methods. Here, the known methods include the K-means method.

In step S12, if the clustering error is less than a predetermined threshold (i.e., "YES" in step S12), partial shape detection processing section 106 sets the number of voting directions to three, and sets the center direction of each cluster as the voting direction of local peak position $x_j$ (j=1, . . . , J). Further, partial shape detection processing section 106 (equivalent to the "angle calculating section" of the present invention") measures angles formed by the normals to the candidate positions from three sides, for which voting is performed, and lines of a uniform direction passing points where the sides cross the normals. In other words, partial shape detection processing section 106 measures the voting directions.

In step S13, if the clustering error is not less than the predetermined threshold (i.e., "NO" in step S12), partial shape detection processing section 106 stores that $x_j$ is not a candidate point of center point position O1 of the inscribed circle.

Next, in step S14, if the clustering error is less than a predetermined threshold (i.e., "YES" in step S12), partial shape detection processing section 106 (equivalent to the relative relationship calculating section) determines whether the relative relationships between the angles of the voting directions of local peak positions $x_j$ (j=1, . . . , J) match the relative relationships between the angles of the normal directions to the tangent points of the inscribed circle (O1, r1).

Figure 4:
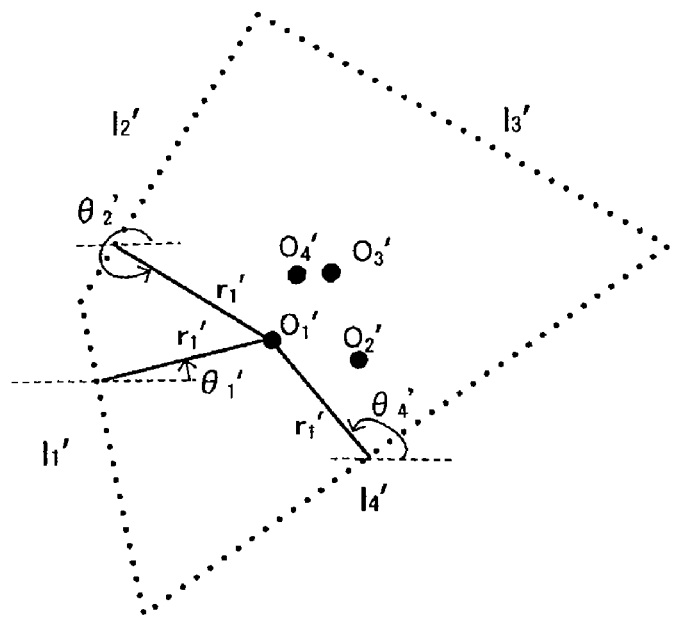
FIG. 4 illustrates an example of extraction of an inscribed circle of a shape included in an input image.

In step S15, if these relative relationships are matched (i.e., "YES" in step S14), partial shape detection processing section 106 (equivalent to the relative relationship calculating section of the present invention) stores local peak position $x_j$ as a candidate position of the center point position O1 of the inscribed circle. In step S13, if those relative relationships are not matched (i.e., "NO" in step S14), partial shape detection processing section 106 stores that $x_j$ is not a candidate position for center point position O1 of the inscribed circle. For example, as shown in FIG. 4, when three voting directions θ1', θ2', and θ4' of candidate position O1' for center point position O1 of the inscribed circle are measured, partial shape detection processing section 106 determines whether the relative relationships between angles |θ1'-θ2'|, |θ2'-θ4'| and |θ4'-θ1'| of voting directions θ1', θ2' and θ4' is equivalent to the relative relationships between angles |θ1-θ2|, |θ2-θ4| and |θ4-θ1| of normal directions θ4, θ1 and θ2 at the three tangent points shown in table 1. However, the relative relationships need not be limited to the relative relationships between θ1' and θ1, θ2' and θ2, and θ4' and θ4. If the relative relationships between angles |θ1'-θ2'|, |θ2'-θ4'| and |θ4'-θ1'| is equivalent to the relative relationships between angles |θ1-θ2|, |θ2-θ4| and |θ4-θ1|, partial shape detection processing section 106 finds the respective voting directions of θ1, θ2 and θ4.

In step S16, partial shape detection processing section 106 decides whether processing for all the local peak positions $x_j$ (j=0, . . . , J) are finished.

In step S17, if processing for all the local peak positions $x_j$ are not finished (i.e., "NO" in step 16), j increases by one, and, after that, processing in steps S11 to S15 are performed. If processing for all the local peak positions $x_j$ are finished (i.e., "YES" in step 16), the flow proceeds to step S18.

In step S18, partial shape detection processing section 106 outputs local peak position O1' matching center point position O1 of the inscribed circle, matching radius r1' and matching voting direction (θ1', θ2', θ4').

Next, shape form processing section 107 calculates the relative scale change ratio and relative rotation angle between the shapes in the input image and the standard template based on the processing result in shape feature processing section 102 and the processing result in partial shape detection processing section 106. For example, with quadrangle S1 shown in FIG. 2C, when inscribed circle candidate (O1', r1') is outputted from partial shape detection processing section 106 as shown in FIG. 4, shape form processing section 107 calculates the relative scale change ratio from r1'/r1 and the relative rotation angular from (θ1'-θ1+θ2'-θ2+θ4'-θ4)/3.

Shape recognition processing section 108 (equivalent to the "recognition section" of the present invention) detects the whole shape based on the relative positional relationships between the partial shapes calculated in shape form processing section 107. Taking into account the results of the relative scale change ratio and relative rotation angle calculated in shape form processing section 107, shape recognition processing section 108 decides whether the relative positional relationships between O2', O3' and O4' with respect to O1' match the relative positional relationships between the center points shown in table 1. If these relative positional relationships are matched, shape recognition processing section 108 outputs a detection result that figure S1 included in the input image match the template shown in FIG. 2A.

Variation Example

The above-described detailed explanation does not limit the scope of the present invention. For example, the following embodiment is possible.

If local peak position O1' of the partial shape matching center point position O1 of the inscribed circle is detected from the input image, it is possible to predict the positions of local peak positions O2', O3' and O4' taking into account the relative scale change ratio, relative rotation angle and the component feature table shown in table 1. By deciding whether local peak positions locate near the predicted local peak positions O2', O3' and O4' using the results in voting processing section 105, it is possible to realize shape detection.

Further, with the template shape shown in FIG. 3, not all the four inscribed circles but instead two of them can be described in the component feature table in table 1. By detecting the relative relationships between the two inscribed circles and angles, it is possible to realize shape detection of figure S1.

Further, in a case where not all the inscribed circles are utilized, it is possible to select any inscribed circles. Further, it is equally possible to select inscribed circles in order of the scale of radius or based on other measurements.

Further, although an example has been described above with the present embodiment where shape feature processing section 102 extracts a circle tangent to three arbitrary sides at three points, the present invention is not limited to this. Shape feature processing section 102 may employ a configuration extracting a circle tangent to three or more arbitrary sides at three or more points. For example, shape feature processing section 102 may employ a configuration extracting a circle tangent to four arbitrary sides in four points. Here, even in the case where a circle tangent to four arbitrary sides in four points is extracted, it is equally possible to extract a circle tangent to three arbitrary sides at three points.

Further, it is possible to use the detection result from shape recognition processing section 108 and above-noted processing to either detect the existence of a specific shape or extract a shape similar to a specific shape.

According to the present embodiment, it is possible to detect at high speed whether line segments exist in designated positions, so that it is equally possible to detect specific shapes at high speed in the present embodiment. Further, to detect a combination of a plurality of line segments, the distribution of edge points is valued more than the intensity of edge points. Therefore, it is possible to improve robustness.

Embodiment 2

With the present embodiment, a method of generating a component feature table for shapes of the detection target generated in shape feature processing section 102.

Figure 7:
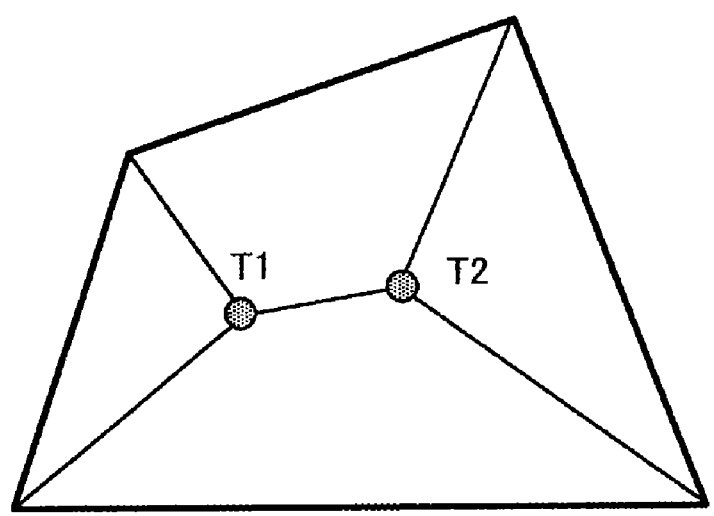
FIG. 7 illustrates an example of calculating skeletons (thin lines) according to Embodiment 2 of the present invention.

Up till now, the skeleton extraction technique for binary images is known in the field of image processing. For example, shape feature processing section 102 sets the inside part to 1 and the outside part to 0 with respect to the standard template shown in FIG. 2, and generates a binary image. With the skeleton extraction technique, shape feature processing section 102 finds skeletons (thin lines) as shown in FIG. 7. Shape feature processing section 102 sets intersections T1 and T2 on the skeletons, as the center point of the inscribed circles tangent to the three sides at the three points shown in table 1.

Shape feature processing section 102 finds the radius of the inscribed circle as follows. First, shape feature processing section 102 finds the edge points of the above binary image. Next, shape feature processing section 102 supposes radius r, and voting is performed using the found edge points. Further, shape feature processing section 102 calculates a voting value of the positions of above skeleton intersections T1 and T2. Finally, according to the association relationship between the above voting value and r, shape feature processing section 102 sets r maximizing the voting value as the radius of the inscribed circle, calculates the normal directions of the tangent points, and generates the component feature table shown in table 1.

Embodiment 3

According to the present embodiment, shape feature processing section 102 finds features of one or more straight line segments forming a shape in addition to features of the inscribed circle, and describes these in the component feature table for the detection target shape.

In the case of the standard template shown in FIG. 8A, shape feature processing section 102 generates the component feature tables shown in the following tables 2A and 2B. Table 2A describes features of an inscribed circle and table 2B describes features of other line segments that do not share the inscribed circle.

TABLE 2A

| Center point of inscribed circle | Radius of inscribed circle | Normal direction of tangent point |
|---|---|---|
| O | r | θ3, θ4, θ5 |

TABLE 2B

| Line segment | Middle point (described as relative position with respect to center point of inscribed circle) | Direction | Length |
|---|---|---|---|
| m1 | P1 | α1 | L1 |
| m2 | P2 | α2 | L2 |
| m3 | P3 | α3 | L3 |
| m4 | P4 | α4 | L4 |

Shape feature processing section 102 described in table 2B respective middle points P1, P2, P3 and P4 of straight line segments m1, m2, m3 and m4, directions OP1, OP2, OP3 and OP4 (not shown) connecting respective middle points and the center point of the inscribed circle, and respective lengths L1, L2, L3 and L4 (not shown). Middle points P1, P2, P3 and P4 are represented by relative positions with respect to the coordinate of center point O of the inscribed circle. Directions α1 to α4 are angles formed by line segments OP1, OP2, OP3 and OP4 and a straight line (for example, scanning lines of the screen) of a uniform direction passing center point O.

Figure 2A:
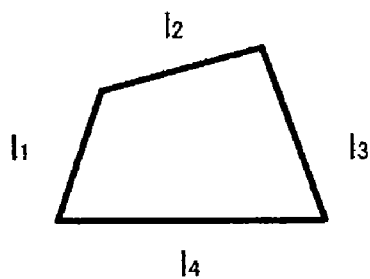
FIG. 2A illustrates an example of a standard template of the detection target shape according to Embodiment 1.
Figure 2B:
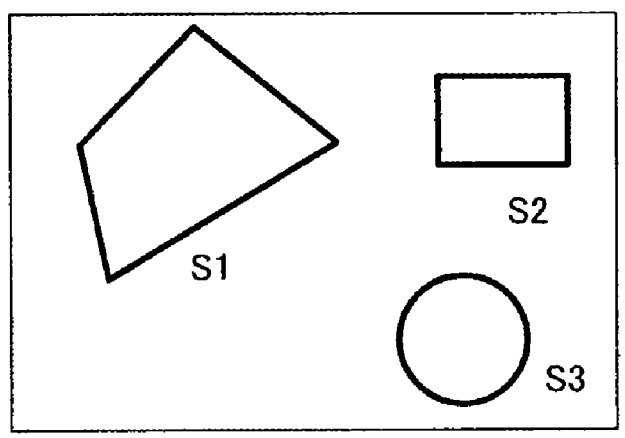
FIG. 2B illustrates an example of an input image outputted from an imaging section.
Figure 2C:
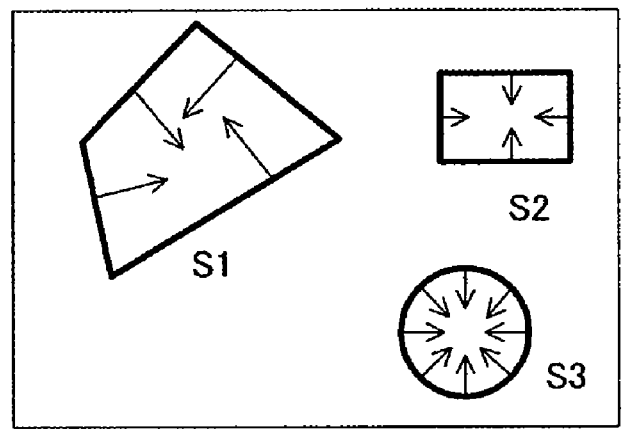
FIG. 2C illustrates an example of edge points and normal directions according to Embodiment 1.
Figure 3:
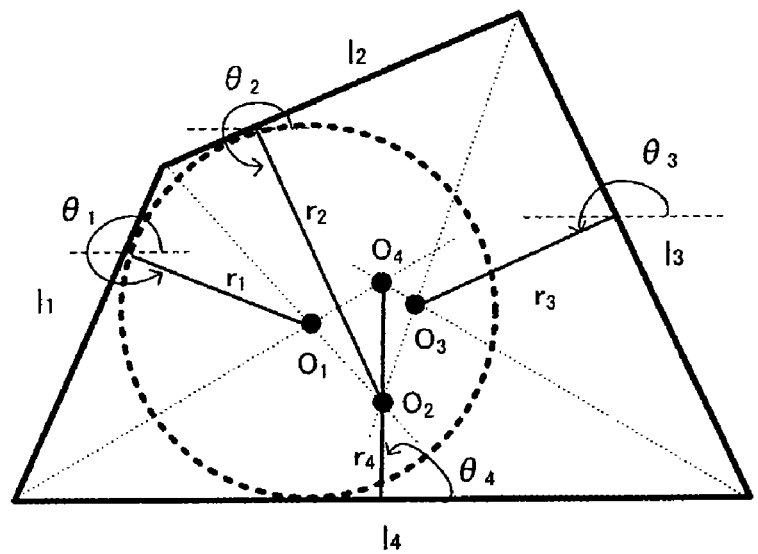
FIG. 3 illustrates an example of extraction of an inscribed circle according to Embodiment 1.

Features of the inscribed circle (O, r) shown in FIG. 2A are measured as explained in Embodiment 1. For example, by detecting the inscribed circle, partial shape detection processing section 106 detects a combination of line segments (13', 14', 15') of the specific shape with respect to the image shape shown in FIG. 8B.

Shape form processing section 107 calculates a relative scale change rate and relative rotation angle for a combination (13, 14, 15) in the standard template shown in table 2B.

Shape recognition processing section 108 checks whether there are image edges matching line segments m1, m2, m3 and m4, based on a position of the inscribed circle, the relative scale change rate, the relative rotation angle and the component feature table shown in table 2B. To be more specific, shape recognition processing section 108 calculates the position and length of each line segment in the image, and sums up the numbers of edge points that exist on the line segments. When the number of edge points is greater than a designated threshold, shape recognition processing section 108 recognizes the existence of the line segment. If shape recognition processing section 108 can recognize the existence of all the line segments, shape recognition processing section 108 detects that the whole shape shown in FIG. 8A exists. That is, by predicting all the other sides and calculating the numbers of edge points on the predicted sides, shape recognition processing section 108 recognizes the shape including the predicted sides.

Figure 8A:
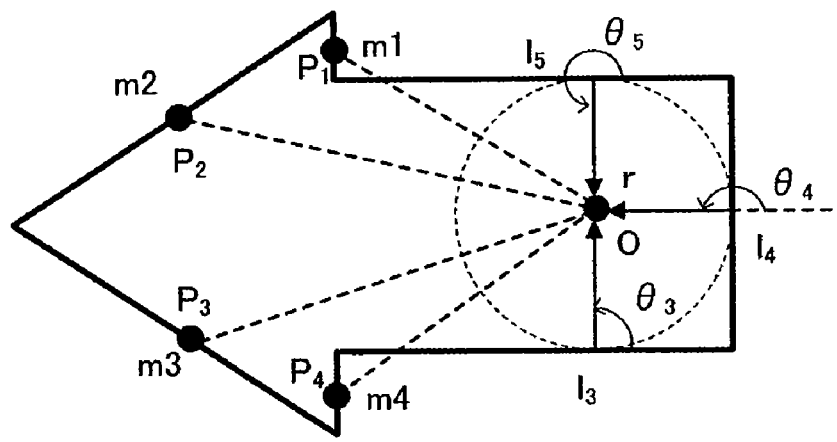
FIG. 8A illustrates an example of a standard template of the detection target shape according to Embodiment 3 of the present invention.
Figure 8B:
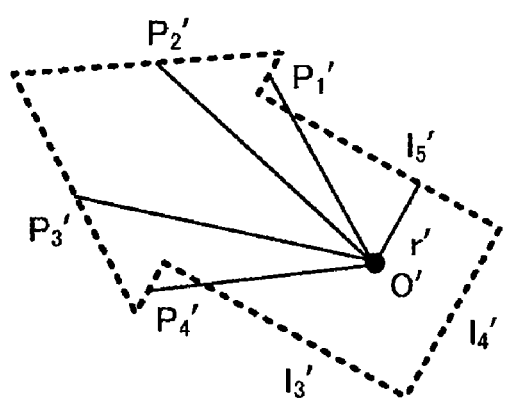
FIG. 8B illustrates an example of extraction the image shape included in an input image.

According to the present embodiment, the above-noted processing is especially useful for relatively short line segments forming the detection target shape (e.g., m1 and m4 in FIG. 8A). It is possible to detect at high speed whether line segments exist in designated positions, so that it is equally possible to detect specific shapes at high speed. Further, to detect a combination of a plurality of line segments, the distribution of edge points is valued more than the intensity of edge points. Therefore, it is possible to improve robustness.

Embodiment 4

A detection example will be explained with the present embodiment where there is a curve line segment in the detection target shape.

Figure 9A:
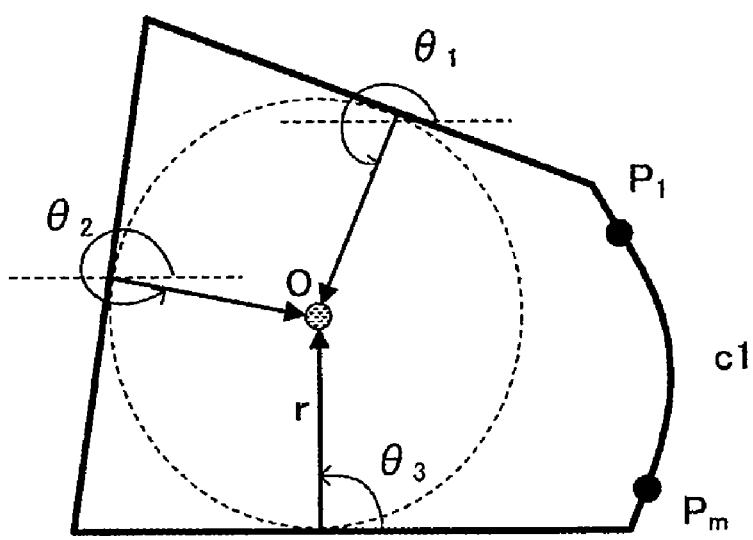
FIG. 9A illustrates an example of a standard template of the detection target shape according to Embodiment 4 of the present invention.

FIG. 9A illustrates an example of a standard template. Shape feature processing section 102 generates the component feature tables shown in following tables 3A and 3B. Table 3A describes features of an inscribed circle as in table 1 and table 3B describes features of a curve line segment that does not share the inscribed circle.

TABLE 3A

| Center point of inscribed circle | Radius of inscribed circle | Normal direction of tangent point |
| --- | --- | --- |
| O | r | θ1, θ2, θ3 |

TABLE 3B

| Curve line segment | Sample point 1 | ... | Sample point m |
| --- | --- | --- | --- |
| c1 | P1 | ... | Pm |

As shown in FIG. 3B, shape feature processing section 102 describes the position of point m sampling curve line segment c1. The position of the sample point on curve line segment c1 is represented by the relative position with respect to the center point of the inscribed circle (O, r) shown in table 3A.

Figure 9B:
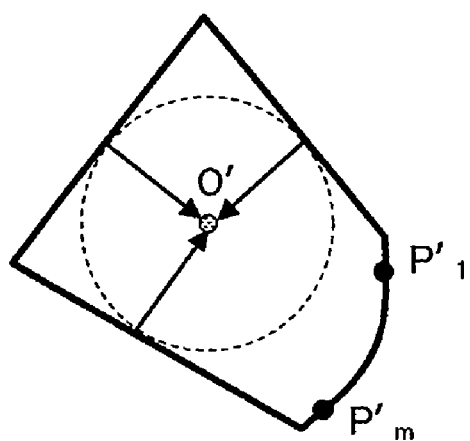
FIG. 9B illustrates an example of extraction of the shapes of image included in an input image.

When a shape matching the standard template, for example, the shape shown in FIG. 9B, is to be detected from an image, first, as described in Embodiment 1, partial shape detection processing section 106 detects a combination of line segments that share an inscribed circle of the specific shape. Next, shape form processing section 107 detects a relative scale and relative rotation with respect to the standard template. Further, shape recognition processing section checks whether there is an image edge matching the curve line segment based on a position of the inscribed circle, the relative scale change rate, the relative rotation angle and the component feature table. That is, shape recognition processing section 108 sums up the number of edge points that should exist in an image position matching the set sample points. If shape recognition processing section 108 can recognize the existence of the matching edges, shape recognition processing section 108 detects that the whole shape shown in FIG. 9A exists.

Further, when the curve line segment is represented by an analysis formula, it is possible to find a position matching the curve line segment from the image and sum up the number of edge points that exist in the found position.

According to the present embodiment, it is possible to detect at high speed whether line segments exist in designated positions, so that it is possible to detect specific shapes at high speed with the present embodiment. Further, to detect a combination of a plurality of line segments, the distribution of edge points is valued more than the intensity of edge points. Therefore, it is possible to improve robustness.

Embodiment 5

With the present embodiment, it is possible to perform detection when one shared inscribed circle exists in the detection target shape.

In this case, only relative normal directions at the tangent points are described in a feature table, so that it is possible to detect specific shapes without utilizing a standard template.

Figure 10A:
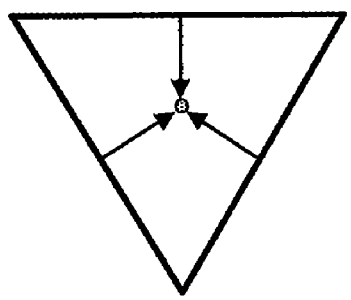
FIG. 10A illustrates an example of the shapes of image included in an input image.

As an example, when the triangular shape shown in FIG. 10A is detected, if there are three voting directions and their relative directions are all less than 180°, it is possible to detect the existence of the triangular shape. Further, if all the relative directions are 120°, a regular triangle is detected.

Figure 10B:
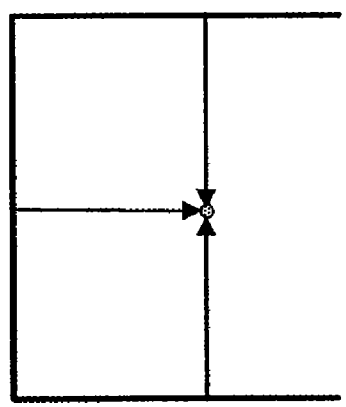
FIG. 10B illustrates an example of extraction of the shapes of image included in an input image.

Further, if there are three voting directions and their relative directions are 90°, 180° and 90° with respect to the shape shown in FIG. 10B, a predetermined shape is detected.

According to the present embodiment, to detect a combination of a plurality of line segments, the distribution of edge points is valued more than the intensity of edge points. Therefore, it is possible to improve robustness.

The image processing apparatus and image processing method related to Embodiments 1 to 5 have been explained above. The present invention is applicable to computer programs that can execute image processing methods.

INDUSTRIAL APPLICABILITY

The present invention provides advantages of being able to detect specific shapes from an image at high speed and improve robustness, and is useful for various apparatuses and methods such as image processing apparatuses and image processing methods, robot navigations and building detection by remote sensing.

The invention claimed is:

1. An image processing apparatus comprising:
a candidate position calculating section that calculates, from a given image, a first candidate position for a center point of a first circle tangent to three sides included in a detection target shape at three points;
an angle calculating section that calculates angles formed by normals from the three sides to the first candidate position and reference lines of a uniform direction passing points where the normals and the sides cross;
a relative relationship calculating section that calculates relative relationships of the angles with respect to the first candidate position; and
a recognizing section that recognizes a shape included in the given image from the relative relationships of the angles and relative relationships of angles of a shape stored in advance.

2. The image processing apparatus according to claim 1, wherein:
the candidate position calculating section further calculates a second candidate position of a second circle tangent to different three sides included in the detection target shape at three points, the different three sides not overlapping with at least one of the three sides for the first circle;
the angle calculating section further calculates angles formed by normals from the different three sides for the second circle to the second candidate position and the reference lines of a uniform direction and passing points where the normals and the three different sides for the second circle cross;

the relative relationship calculating section further calculates relative relationships of the angles with respect to the second candidate position; and the recognizing section recognizes a shape comprising sides matching the three sides for the first circle and sides matching the different three sides for the second circle included in the given image, from the relative relationships of the angles with respect to the first candidate position, the relative relationships of the angles with respect to the second candidate position, and the relative relationships of the angles of the shape stored in advance.

3. The image processing apparatus according to claim 1, further comprising a shape feature processing section that sets an intersection that exists on skeletons in the shape stored in advance, as a center point of a circle, and measures a normal direction of a tangent point of the circle in the shape stored in advance, as a feature of the shape.

4. The image processing apparatus according to claim 1, wherein the recognizing section further predicts other sides than the three sides, calculating the numbers of edge points of said other sides than the three sides and recognizes a shape comprising said other sides than the three sides.

5. The image processing apparatus according to claim 1, wherein the recognizing section further calculates the number of edge points of a side different from the three sides and recognizes a shape comprising the side different from the three sides included in the given image, based on the number of the edge points.

6. An image processing apparatus comprising:
an imaging section;
an edge processing section that calculates an edge from a picked-up image picked up in the imaging section;
a normal vector processing section that calculates a normal vector of an edge point of the edge calculated in the edge processing section;
a voting processing section that performs voting based on the edge calculated in the edge processing section and the normal vector calculated in the normal vector processing section;
a partial shape detection processing section that detects at least one partial shape of a detection target shape from the picked-up image based on a voting result generated in the voting processing section;
a shape feature processing section that calculates a shape feature table of a detection target based on partial shapes that share an inscribed circle, using a standard template stored in advance for the detection target shape;
a shape form processing section that calculates a scale change ratio and rotation angle of the detection target shape based on the partial shape detected in the partial shape detection processing section and the shape feature table; and
a shape recognizing section that detects a whole target shape based on the rotation angle and the shape feature table.

7. An image processing method comprising the steps of:
calculating from a given image, a first candidate position of a center point of a first circle tangent to three sides included in a detection target shape at three points;
calculating angles formed by normals from the three sides to the first candidate position and reference lines of a uniform direction passing points where the normals cross the three sides;
calculating a relative relationship of the angles with respect to the first candidate position; and
recognizing a shape comprising three sides included in the given image, from the relative relationship of the angles and relative relationships of angles of a shape stored in advance.

* * * * *